United States Patent
Matsumoto (10) Patent No.: US 11,526,134 B2
(45) Date of Patent: Dec. 13, 2022

(54) TEMPO SETTING DEVICE AND CONTROL METHOD THEREOF

(71) Applicant: YAMAHA CORPORATION, Shizuoka (JP)

(72) Inventor: Shuichi Matsumoto, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 240 days.

(21) Appl. No.: 16/856,926

(22) Filed: Apr. 23, 2020

(65) Prior Publication Data

US 2020/0249633 A1 Aug. 6, 2020

Related U.S. Application Data

(63) Continuation of application No. PCT/JP2017/038593, filed on Oct. 25, 2017.

(51) Int. Cl.
*G04F 5/02* (2006.01)
*G10H 1/40* (2006.01)
*G10L 15/10* (2006.01)

(52) U.S. Cl.
CPC ............. *G04F 5/025* (2013.01); *G10H 1/40* (2013.01); *G10L 15/10* (2013.01)

(58) Field of Classification Search
CPC ............ G04F 5/025; G10H 1/40; G10L 15/10
USPC .......................................................... 84/612
See application file for complete search history.

(56) References Cited

U.S. PATENT DOCUMENTS

| 4,380,185 A | * | 4/1983 | Holcomb | G04F 5/025 84/DIG. 12 |
| 5,027,686 A | * | 7/1991 | Ishikawa | G04F 5/025 84/DIG. 12 |
| 9,202,520 B1 | * | 12/2015 | Tang | G10L 15/24 |
| 2008/0115656 A1 | * | 5/2008 | Sumita | G10G 3/04 84/612 |
| 2011/0023691 A1 | * | 2/2011 | Iwase | G10H 1/0066 381/119 |
| 2014/0006031 A1 | * | 1/2014 | Mizuguchi | G10H 7/02 704/260 |
| 2018/0295427 A1 | * | 10/2018 | Leiberman | H04N 21/8456 |
| 2020/0043511 A1 | * | 2/2020 | Raikar | G10L 21/043 |

(Continued)

FOREIGN PATENT DOCUMENTS

| CN | 1670641 A | * | 9/2005 | ............ G04F 5/025 |
| JP | S57184993 U | | 11/1982 | |

(Continued)

OTHER PUBLICATIONS

International Search Report and Written Opinion in PCT/JP2017/038593 dated Jan. 16, 2018.

(Continued)

*Primary Examiner* — Christina M Schreiber
(74) *Attorney, Agent, or Firm* — Chip Law Group (57) ABSTRACT

Disclosed herein is a tempo setting device including a detecting unit that deems a predetermined utterance as a detection target and detects the utterance of the detection target through recognizing sound, a tempo deciding unit that decides a tempo based on a detection interval of the detected utterance in response to two or more times of consecutive detection of the utterance of the detection target by the detecting unit, and a setting unit that sets the tempo decided by the tempo deciding unit.

14 Claims, 8 Drawing Sheets

(56) References Cited

U.S. PATENT DOCUMENTS

| | | | |
|---|---|---|---|
| 2020/0066294 A1* | 2/2020 | Zass | G10L 25/66 |
| 2020/0249633 A1* | 8/2020 | Matsumoto | G10H 1/42 |
| 2022/0005460 A1* | 1/2022 | Yamashita | G10L 13/10 |
| 2022/0084491 A1* | 3/2022 | Torikura | G10L 15/22 |

FOREIGN PATENT DOCUMENTS

| | | | | |
|---|---|---|---|---|
| JP | 57206883 | A | * | 12/1982 |
| JP | S57206883 | A | | 12/1982 |
| JP | 02256096 | A | * | 10/1990 |
| JP | H02256096 | A | | 10/1990 |
| JP | H06126097 | A | | 5/1994 |
| JP | 08063168 | A | * | 3/1996 |
| JP | H0863168 | A | | 3/1996 |
| JP | H10301567 | A | | 11/1998 |
| JP | H11272283 | A | | 10/1999 |
| JP | 2000172290 | A | | 6/2000 |
| JP | 2001141852 | A | | 5/2001 |
| JP | 2001195058 | A | | 7/2001 |
| JP | 2003131695 | A | | 5/2003 |
| JP | 2007298786 | A | | 11/2007 |
| JP | 2012145802 | A | * | 8/2012 |
| JP | 2015132696 | A | | 7/2015 |
| JP | 2022006836 | A | | 1/2022 |
| KR | 20170120234 | A | * | 10/2017 |
| WO | WO-2019082320 | A1 | * | 5/2019 |

OTHER PUBLICATIONS

Notice of Refusal cited in Japanese Application No. 2021-088571, dated Jun. 24, 2022.

Decision of Refusal cited in Japanese Application No. 2021-088571, dated Oct. 20, 2022.

* cited by examiner

TEMPO SETTING DEVICE AND CONTROL METHOD THEREOF

CROSS REFERENCE TO RELATED APPLICATIONS

This application is a continuation of International Patent Application No. PCT/JP2017/038593 filed on Oct. 25, 2017. Each of the above-referenced applications is hereby incorporated herein by reference in its entirety.

BACKGROUND

The present disclosure relates to a tempo setting device that sets the tempo, a control method thereof, and a program.

A metronome of an electronic system generally has a configuration in which a user directly sets the meter and the tempo by using an operation element. Furthermore, a synchronization signal generating device is known that measures the time interval of a click signal generated through operation of an operation element and sequentially records time information corresponding to it and generates a synchronization signal shorter than the time interval of the click signal according to the recorded time information (refer to Japanese Patent No. 1532178). Moreover, an electronic metronome is also known that decides the sound emission speed of the metronome from the cycle of a signal arising from detection of vibration of shock due to hitting of the main body (refer to Japanese Patent Laid-open No. 2001-141852).

SUMMARY

However, according to the above-described related arts, the user needs to carry out some sort of operation action by using a hand, finger, or the like in order to set the tempo. For this reason, for example, in an ensemble, when wanting to change the tempo setting due to change of the performed music, the leader needs to approach the tempo generating device and operate it for every change, which is troublesome.

It is desirable to provide a tempo setting device that can set the tempo through utterance, a control method thereof, and a program.

According to an embodiment of the present disclosure, there is provided a tempo setting device including a detecting unit that deems a predetermined utterance as a detection target and detects the utterance of the detection target through recognizing sound, a tempo deciding unit that decides a tempo based on a detection interval of the detected utterance in response to two or more times of consecutive detection of the utterance of the detection target by the detecting unit, and a setting unit that sets the tempo decided by the tempo deciding unit.

According to another embodiment of the present disclosure, there is provided a control method of a tempo setting device, the control method including deeming a predetermined utterance as a detection target and detecting the utterance of the detection target through recognizing sound, deciding a tempo based on a detection interval of the detected utterance in response to two or more times of consecutive detection of the utterance of the detection target by the detecting, and setting the tempo decided by the deciding.

According to a further embodiment of the present disclosure, there is provided a program for a computer, including: by a detecting unit, deeming a predetermined utterance as a detection target and detecting the utterance of the detection target through recognizing sound; by a tempo deciding unit, deciding a tempo based on a detection interval of the detected utterance in response to two or more times of consecutive detection of the utterance of the detection target by the detecting; and by a setting unit, setting the tempo decided by the deciding.

According to the embodiments of the present disclosure, the tempo can be set by utterance.

DETAILED DESCRIPTION OF THE PREFERRED EMBODIMENT

An embodiment of the present disclosure will be described below with reference to the drawings.

Figure 1:
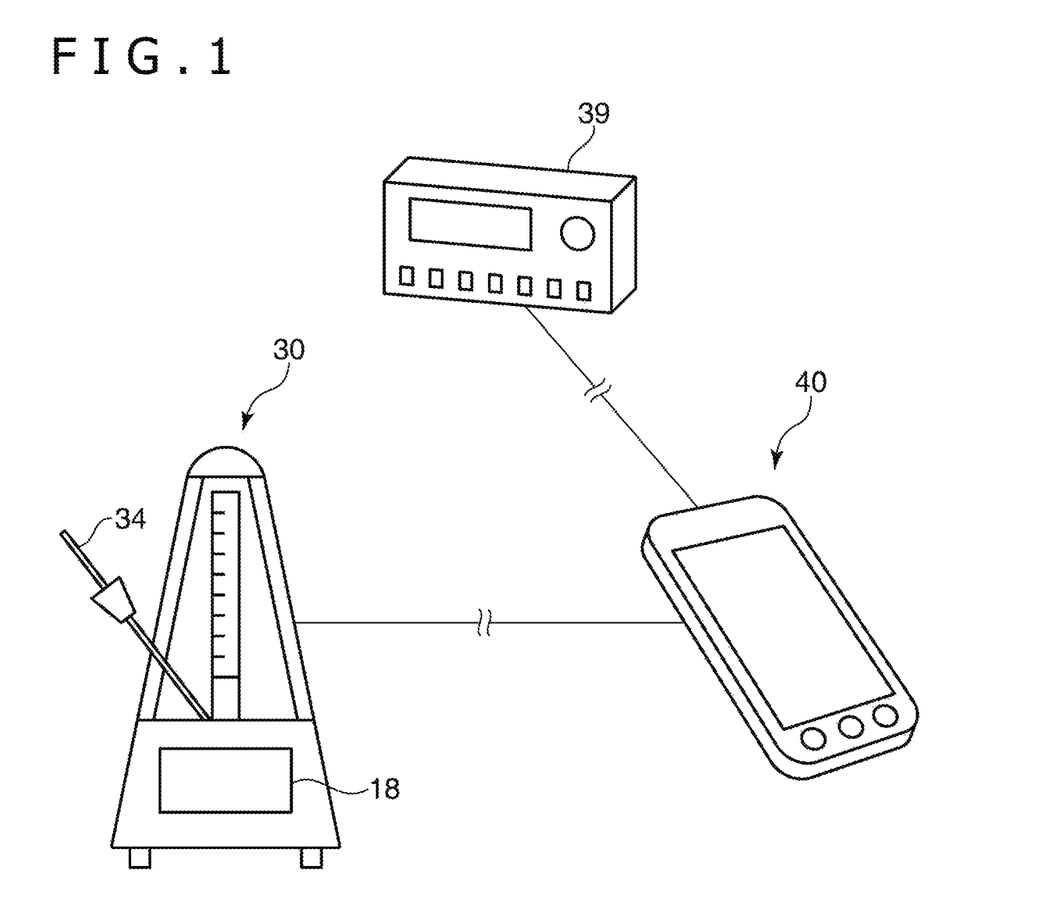
FIG. 1 is a diagram illustrating the overall configuration of a tempo setting system including a tempo setting device.

FIG. 1 is a diagram illustrating the overall configuration of a tempo setting system including a tempo setting device according to one embodiment of the present disclosure. The tempo setting device of the embodiment of the present disclosure is configured as a metronome 30 as one example. Although being a mechanical metronome in terms of appearance, the metronome 30 has a display function based on a display part 18 in addition to a sound emission function. The metronome 30 can present a metronome pattern (meter and tempo) by action of a pendulum 34. Besides, the metronome 30 has a function of presenting the metronome pattern also by displaying or sound. An information terminal device 40 such as a personal computer (PC) or smartphone and the metronome 30 may be communicably connected in a wireless or wired manner and a system in which setting of the metronome pattern can be carried out to the metronome 30 by the information terminal device 40 may be made. Alternatively, a sequencer 39 that reproduces an accompaniment sound and so forth and the metronome 30 may be communicably connected in a wireless or wired manner and a system in which the meter and the tempo can be set to the sequencer 39 by the information terminal device 40 may be made. It suffices that a device connected to the information terminal device 40 when the present disclosure is applied to the information terminal device has a function of presenting at least the tempo by sound, displaying, visible action, or the like. Hereinafter, an example in which the present disclosure is implemented mainly by the metronome 30 alone will be described.

Figure 2:
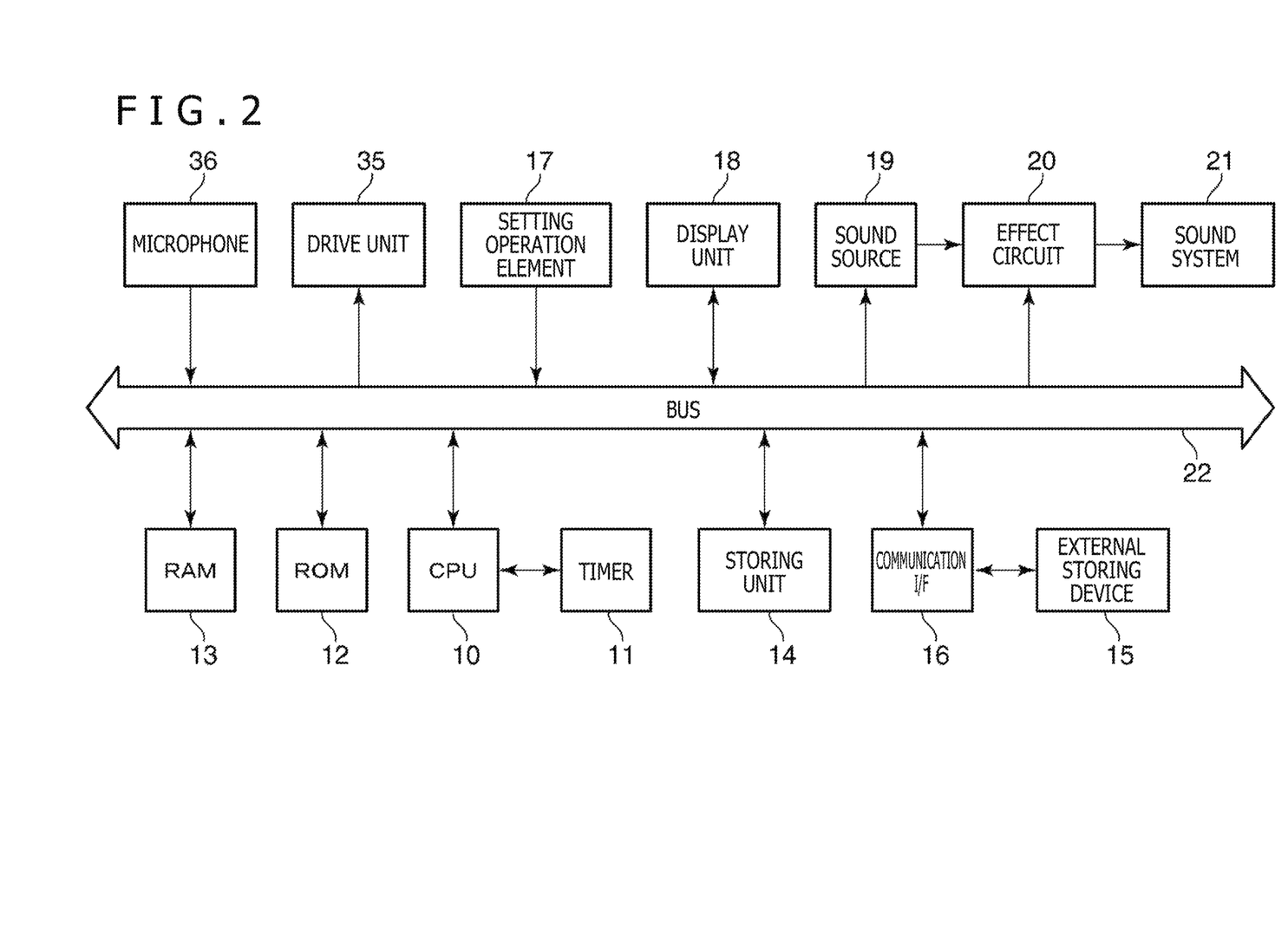
FIG. 2 is a block diagram of a metronome.

FIG. 2 is a block diagram of the metronome 30. The metronome 30 includes a central processing unit (CPU) 10, a timer 11, a read only memory (ROM) 12, a random access memory (RAM) 13, a storing unit 14, a setting operation element 17, a display unit 18, a sound source 19, an effect circuit 20, a sound system 21, a communication interface (I/F) 16, a drive unit 35, a microphone 36, and a bus 22. The CPU 10 is a central processing device that carries out control of the whole of the metronome 30. The timer is a module that measures the time. The ROM 12 is a non-volatile memory that stores a control program, various kinds of data, and so forth. The RAM 13 is a volatile memory used as a work area of the CPU 10, various kinds of buffers, and so forth. The display unit 18 includes a liquid crystal display panel or the like and displays the operation state of the metronome 30, various kinds of setting screens, messages to the user, and so forth.

The setting operation element 17 is an operation module such as an operation button and an operation knob for manually setting the meter and the tempo, for example. An external storing device 15 is external equipment connected to the metronome 30, for example, and is a device that stores sound data, for example. The communication I/F 16 is a communication module for communicating with the external equipment in a wireless or wired manner. A musical instrument digital interface (MIDI) interface is included in the communication I/F 16. The bus 22 carries out data transfer among the respective units in the metronome 30. The microphone 36 acquires ambient sound.

The sound source 19 generates data for sound emission of metronome sound and so forth under control by the CPU 10 based on the metronome pattern stored in the storing unit 14 or the RAM 13. The effect circuit 20 applies an acoustic effect specified by the setting operation element 17 to the data for sound emission generated by the sound source 19. The sound system 21 converts data resulting from the processing by the effect circuit 20 to an analog signal by a digital/analog converter. Then, the sound system 21 amplifies the analog signal and outputs sound from a speaker or the like. The display unit 18 carries out displaying in order to present the meter and the tempo under control by the CPU 10 based on the metronome pattern. The drive unit 35 drives swinging of the pendulum 34 under control by the CPU 10 based on the metronome pattern.

Figure 3:
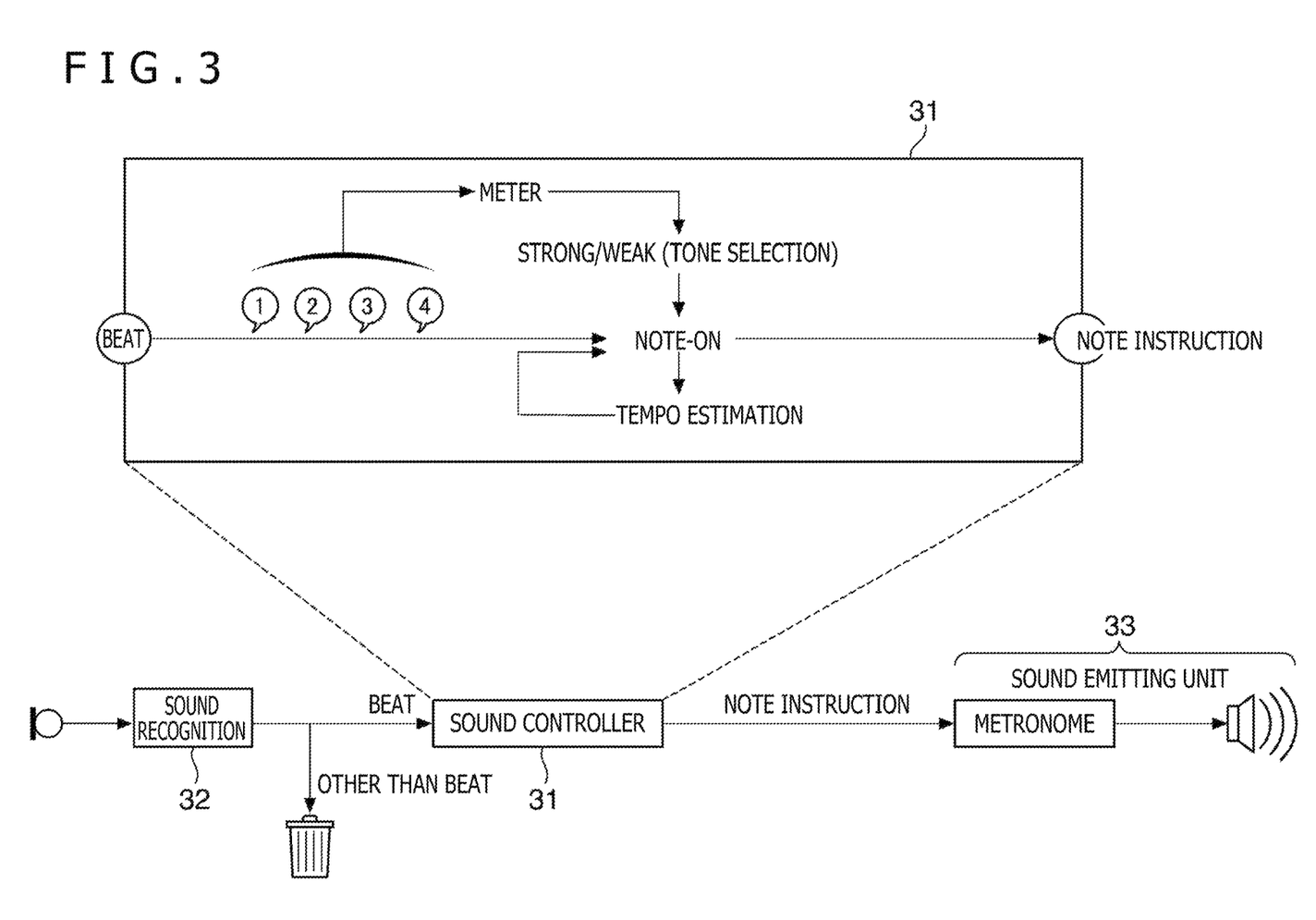
FIG. 3 is a block diagram of the major part for tempo setting.

Next, a method for setting the tempo from utterance by a user will be described. FIG. 3 is a block diagram of the major part for tempo setting. This major part has a sound recognizing unit 32, a sound controller 31, and a sound emitting unit 33. Functions of the sound recognizing unit 32 are implemented mainly by cooperation of the microphone 36, the ROM 12, the RAM 13, and the CPU 10. Functions of the sound controller 31 are implemented mainly by cooperation of the storing unit 14, the ROM 12, the timer 11, the RAM 13, and the CPU 10. Functions of the sound emitting unit 33 are implemented mainly by cooperation of the ROM 12, the RAM 13, the storing unit 14, the sound source 19, the effect circuit 20, the sound system 21, and the CPU 10.

In a tempo setting mode, the sound recognizing unit 32 recognizes voice of a user, for example, a leader in an ensemble, by a publicly-known method and extracts only utterances relating to setting of the beat from the recognized sound to send the utterances to the sound controller 31. The term "utterance" here is what includes at least one syllable, such as "A," "Ton," or "Ichi," and does not need to have a meaning as a word. The sound controller 31 sets the meter and the tempo (or beat interval) as the metronome pattern based on the utterances. Details thereof will be described later with FIGS. 5A and 5B and the subsequent drawings. Based on the set meter and tempo, the sound controller 31 generates information on note-on for presenting them. At this time, the strength contrast may be given to the sound volume between strong beat and weak beat and the tone may be made different therebetween. Then, the sound controller 31 instructs the sound emitting unit 33 to emit sound based on the metronome pattern and the sound emitting unit 33 emits the metronome sound.

Figure 4A:
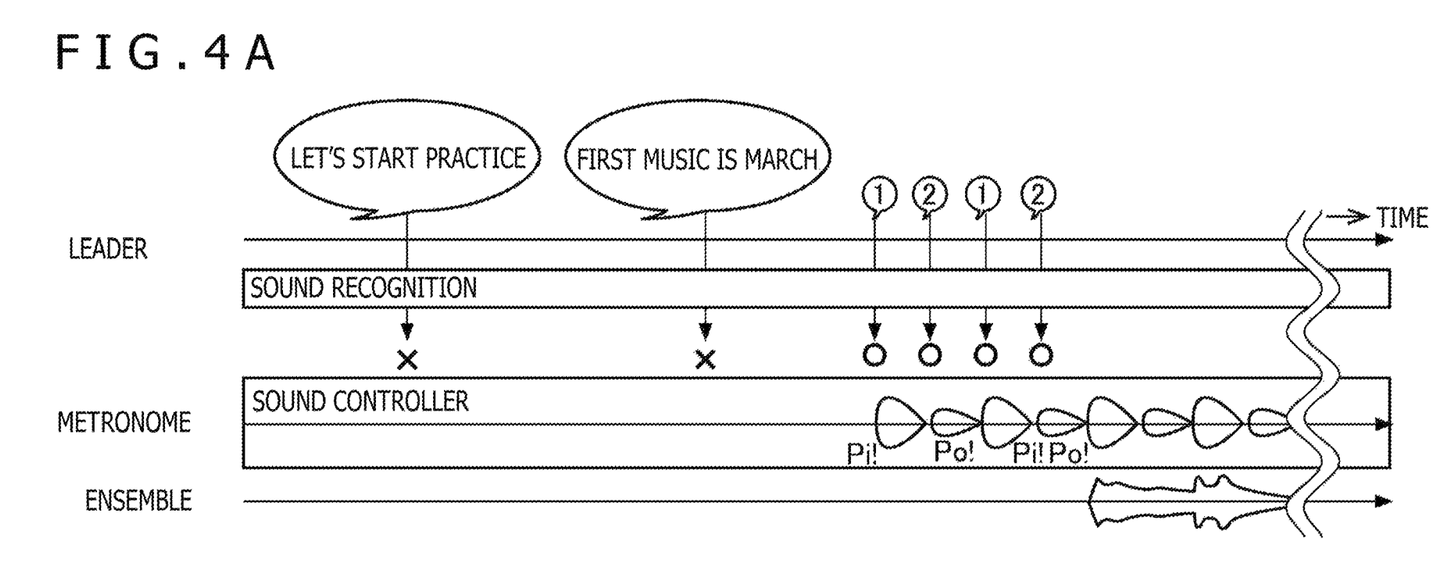
FIG. 4A is a timing chart of a tempo setting operation example.
Figure 4B:
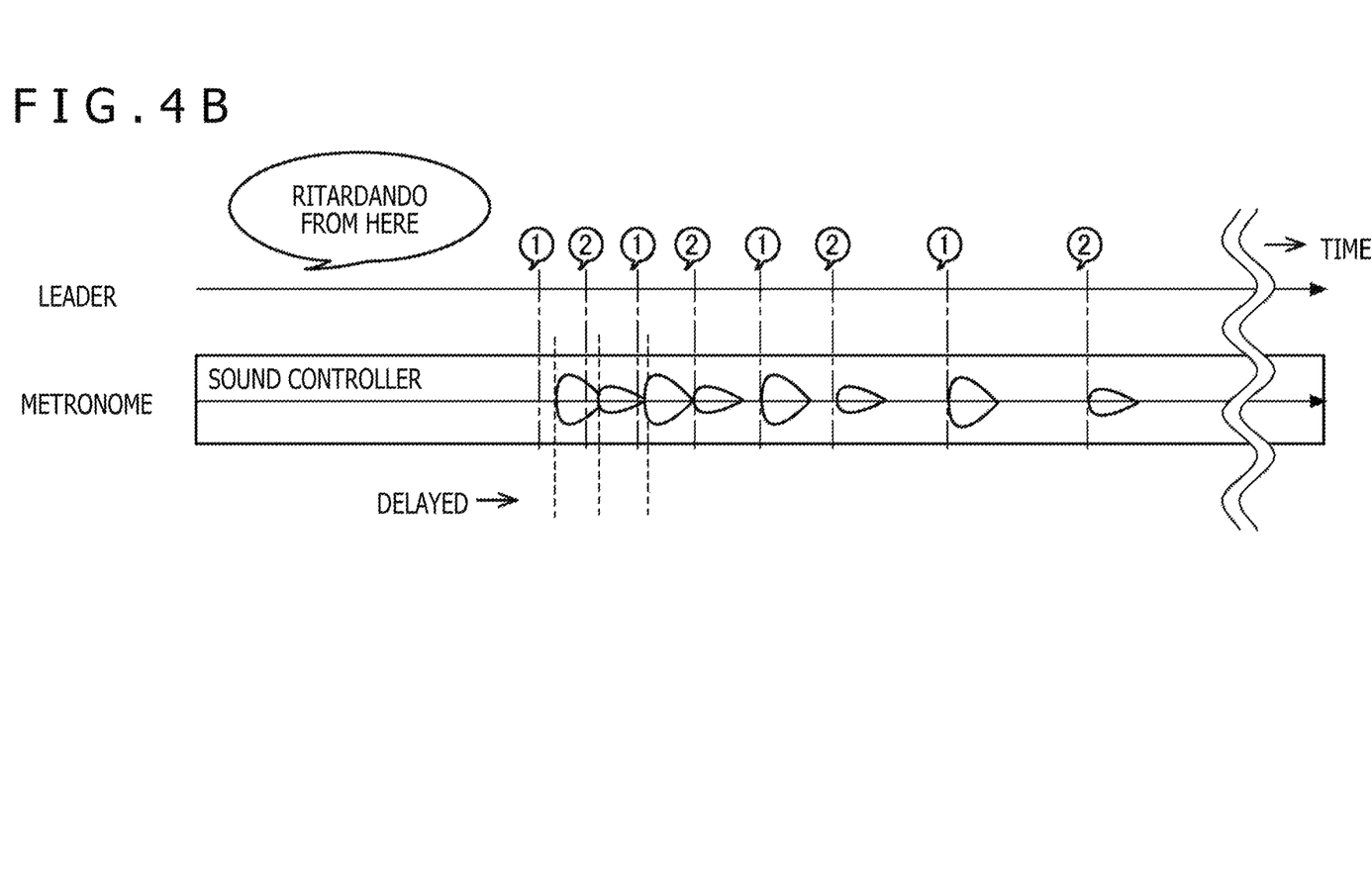
FIG. 4B is a timing chart of a tempo modification operation example.

Next, in FIGS. 4A and 4B, the outline of an operation example of the tempo setting mode will be described. FIG. 4A is a timing chart of a tempo setting operation example. FIG. 4B is a timing chart of a tempo modification operation example. The metronome 30 starts operation of the tempo setting mode through operation of the setting operation element 17, for example, and becomes a standby state in which detection of utterances is possible.

In the tempo setting operation example (FIG. 4A), the leader sets the metronome 30 to the tempo setting mode and conveys start of practice, the rhythm of music, and so forth to ensemble members in advance. Thereafter, the leader utters "Ichi" and "Ni" representing numbers 1 and 2, respectively, as predetermined utterances in such a manner that the voice reaches the microphone 36. In the manner of following the utterances of "Ichi" and "Ni" until the second round, the sound controller 31 (hereinafter, often abbreviated as controller 31) causes emission of predetermined metronome sounds (Pi, Po). The controller 31 decides to employ two-four time due to the repetition of "Ichi" and "Ni." In addition, the controller 31 decides the beat interval and the beat timing according to the utterance timing of "Ichi" and "Ni." The meter and the beat interval (or tempo) become the metronome pattern. Then, the controller 1 causes emission of the metronome sounds in accordance with the metronome pattern after the decision from the utterance timing of "Ni" of the second round or the timing later than it by the beat interval. That is, the metronome sounds (Pi, Po) in double time are continuously emitted. The ensemble members can start the ensemble from the timing of the beginning beat subsequent to the decision of the metronome pattern. The metronome sounds do not necessarily need to be emitted in the following manner before the decision of the metronome pattern. That is, although it is assumed that the metronome sounds (Pi, Po) are generated from a stage previous to the decision of the metronome pattern in the example of FIG. 4A, the emission of these metronome sounds may be started after the metronome pattern is decided.

By specifying the note value of one beat as e.g. one-fourth or one-half in advance to limit the meter that can be decided, discrimination between two-two time and two-four time may be allowed, for example. Particularly in the case in which the tempo is slow or the like, a back beat (one-half beat or the like) may be presented by a predetermined sound.

When wanting to change the tempo and so forth in the middle of continuous emission of the metronome sounds (Pi, Po) in double time, the leader makes utterances anew. For example, suppose that the leader utters "Ichi" and "Ni" again as illustrated in FIG. 4B. In this case, the controller 31 stops the sound emission in accordance with the metronome pattern decided thus far and, instead, carries out sound emission that follows the new utterance. Then, the controller 31 resets the metronome pattern based on the new utterance and causes emission of metronome sounds in accordance with the newly-decided metronome pattern. This can change the tempo in the middle. It is also possible to change the produced utterance to change the meter.

Next, setting forms of the metronome pattern according to various kinds of tempo setting mode will be described with FIGS. 5A and 5B and FIGS. 6A, 6B, 6C, and 6D. There are plural kinds of tempo setting mode. Among them, mode 1 to mode 6 will be exemplified. The kind of tempo setting mode can be set by the user with the setting operation element 17. The kind of utterance (predetermined utterance) deemed as the target of detection through recognition of sound by the sound recognizing unit 32 as a detecting unit is limited. The sound recognizing unit 32 detects (extracts) the utterance of the detection target and ignores (deletes) the utterance that is not the detection target. In response to two or more times of consecutive detection of the utterance of the detection target, the controller 31 decides the tempo based on the detection interval of the detected utterances (tempo deciding unit) and sets the decided tempo (setting unit).

For example, the utterances of the detection target may be what correspond to numerical values like "Ichi, ni, san, yon" or "One, two, three" or may be "Ton," "Tan," or the like having no relation to numbers. Furthermore, a combination may be set in the utterances of the detection target. For example, "Ichi, ni, san" may be deemed as one set and "One, two, three, four" may be deemed as another set. When using the detection target in combination is specified, the utterance in the combination of the detection target may be employed as the detection target. The utterance of the detection target or the combination of the detection target may be a fixed utterance or combination defined in advance. However, it may be arbitrarily set based on an instruction by the user. Information that indicates the detection target is stored in the storing unit 14 and is stored also in the RAM 13 according to need.

Figure 5A:
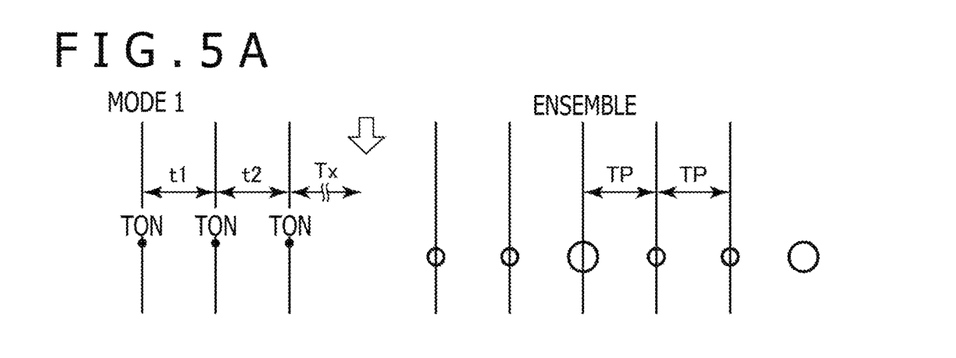
FIG. 5A is a timing chart of a tempo setting operation example in mode 1.
Figure 5B:
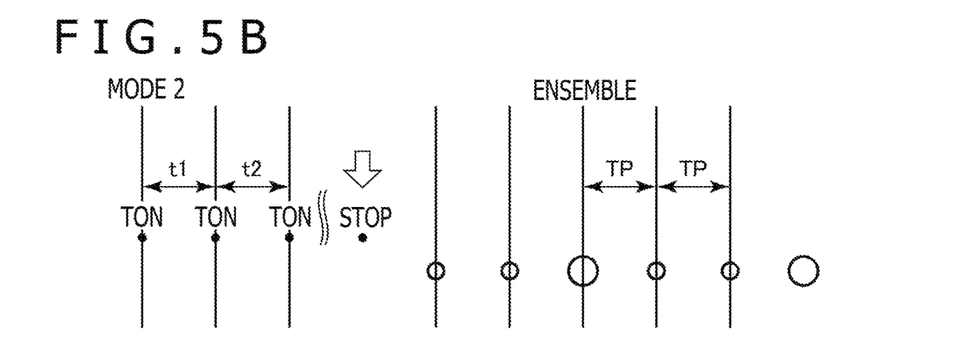
FIG. 5B is a timing chart of a tempo setting operation example in mode 2.

FIGS. 5A and 5B are timing charts of tempo setting operation examples in modes 1 and 2. FIGS. 6A, 6B, 6C, and 6D are timing charts of tempo setting operation examples in modes 3, 4, 5, and 6.

First, suppose that the utterance of the detection target is only one, "Ton," in mode 1 (FIG. 5A). In the standby state immediately after start of operation in mode 1, the controller 31 has decided neither the meter nor the tempo. When "Ton" as the detection target is detected by the sound recognizing unit 32, the sound recognizing unit 32 waits for detection of "Ton" subsequent to it. Then, when "Ton" is consecutively detected two or more times, the controller 31 is allowed to decide the meter and the tempo. Specifically, the meter is decided based on the number of times of consecutive detection of the utterance of the detection target. For example, when the next "Ton" is not detected even after the elapse of a time Tx from the last "Ton" in consecutive pieces of "Ton," the controller 31 decides the meter from the number of consecutive times thus far. In the example of FIG. 5A, "Ton" is consecutively detected three times and thereafter the time Tx elapses. Therefore, the meter (three-four time), the tempo, and the beat timing are decided at a timing indicated by an arrow.

The time Tx is calculated every time the second or subsequent "Ton" is detected. For example, the time Tx in the case of waiting for the elapse from the third "Ton" is calculated based on Tx={(t1+t2)/2}+α (α is positive value). Suppose that the time Tx is a time that is slightly longer than (t1+t2)/2 and is shorter than (t1+t2). The time Tx in the case of waiting for the elapse from the second "Ton" is calculated based on Tx=t1+α. The tempo is calculated based on 60 seconds/beat interval TP (seconds). Here, the beat interval TP is the average of the utterance interval of each utterance ("Ton") as one example and is calculated based on TP=(t1+t2)/2. As the beat timing, the timings that synchronize with the timings of three pieces of consecutive "Ton" are decided, for example.

When the metronome pattern is settled in this manner, the controller 31 carries out "presentation sound emission" in which the metronome pattern is presented with sound by the sound emitting unit 33. It is not essential that the beat timings are synchronized with the timings of the three pieces of consecutive "Ton." For example, by a predetermined utterance ("Start" or the like) after the tempo decision, the presentation sound emission may be started with "Start" being employed as the first beat.

In each diagram of FIGS. 5A and 5B and FIGS. 6A, 6B, 6C, and 6D, a circle mark (white circle) represents the timing and strength of the "presentation sound emission" after the metronome pattern is decided. A large circle (white circle) represents a strong beat and a small circle (white circle) represents a weak beat. In the example of FIG. 5A, the meter is decided as triple time and therefore two weak beats exist in one bar. The form of the presentation sound emission (tone and so forth) may be defined in advance and may be made different between strong beat and weak beat. Furthermore, the tone of the presentation sound emission may be decided according to the meter and the tempo. In the example of FIG. 5A, after the three consecutive pieces of "Ton" and before the strong beat, sounds of weak beats of the second beat and the third beat are also emitted as in the decided metronome pattern. Therefore, the ensemble can be performed from the timing of the first beat (strong beat) at the beginning after the tempo decision. The timing of any first beat (strong beat) may be employed as the ensemble start timing as long as the timing is after the tempo decision. The sound emission of weak beats previous to the first beat at the beginning after the tempo decision is not essential. Furthermore, sound emission that follows an utterance of "Ton" before the tempo decision like that illustrated in FIG. 4A may be set but is not essential. The meter is decided as triple time in FIG. 5A. However, for example, if "Ton" is consecutively detected four times and thereafter the time Tx elapses, the meter is defined as four-four time. In the examples of FIG. 5A and FIG. 5B, it is illustrated that the presentation sound emission is started from the second beat in triple time (weak, weak, strong). However, the presentation sound emission may be started from the beginning beat (strong, weak, weak) or be started from a beat other than the second beat (weak, strong, weak, weak).

In the example of FIG. 5A, only one kind of utterance, "Ton," is employed as the utterance of the detection target. Therefore, for example, with "Hai," "Hai," "Hai," which are not the detection target, the controller 31 does not react and does not carry out tempo setting. Plural kinds of utterance may be employed as the utterance of the detection target and be treated similarly to the case of "Ton" whichever of them is uttered in whatever order. For example, the detection targets may be "Ton," "Hei," and "Ho" and the meter may be decided as triple time through three consecutive utterances of "Hei," "Hei," and "Ho." Furthermore, the meter may be decided as quadruple time through four consecutive utterances of "Hei," "Ton," "Ton," and "Ho."

In mode 2 (FIG. 5B), "Ton" is employed as the utterance of the detection target similarly to mode 1 and "Stop" is employed as an utterance for instruction stop. When two or more pieces of "Ton" are detected, the controller 31 waits for detection of subsequent "Stop." In the example of FIG. 5B, after the last "Ton" in three consecutive pieces of "Ton," at the timing when "Stop" is detected, indicated by an arrow, the meter (three-four time), the tempo, and the beat timing are decided. The beat interval TP is decided similarly to the case of mode 1. The form of "presentation sound emission" after the metronome pattern is decided is similar to that of mode 1. The leader may utter "Stop" immediately after the last "Ton" (after a time sufficiently shorter than t1). The beat timing is decided similarly to mode 1. For example, timings that synchronize with the timings of three consecutive pieces of "Ton" are decided as the beat timing, for example. When the utterance of "Stop" is delayed and is detected after the elapse of a time sufficiently longer than t1 and t2, the controller 31 may decide the beat timing based on the utterance timing of "Stop." For example, the timing of the first beat may be decided in synchronization with the timing of "Stop."

The utterance for instruction stop is not limited to "Stop" and may be another kind, for example, "Hai." Furthermore, plural kinds of utterance may be set also as the utterance for instruction stop and may be treated as valid whichever of them is detected. Mode 2 may be combined with mode 1. For example, the processing of mode 2 may be applied when the utterance for instruction stop is detected before the time Tx elapses from the last "Ton," and the processing described regarding mode 1 may be applied when the time Tx elapses from the last "Ton" without the utterance for instruction stop.

Suppose that, in mode 3 (FIG. 6A), the utterances of the detection target are "Ichi," "Ni," "San," "Yon," "Go," "Roku," "Nana," and "Hachi" representing numbers 1 to 8, respectively. Furthermore, suppose that a predetermined combination of the utterances of the detection target includes utterances that represent the respective beats from the first beat to a predetermined beat (for example, eighth beat). Suppose that the following first set to seventh set are defined as this combination: first set="Ichi" "Ni," second set="Ichi" "Ni" "San," third set="Ichi" "Ni" "San" "Yon" seventh set="Ichi" "Ni" "Hachi." Suppose that the order of utterance is defined in advance in each set, and "Ichi" corresponds to the beginning utterance. It is sufficient that the number of utterances of the detection target belonging to the set is two or more, and the number is not limited to eight.

Figure 6A:
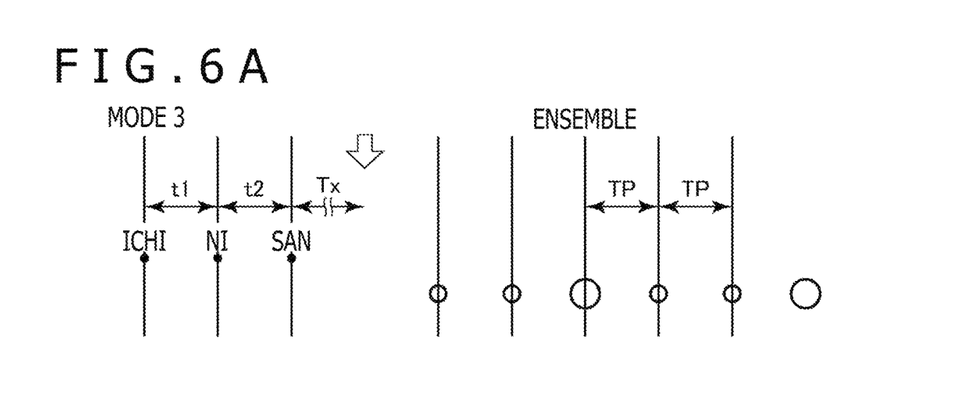
FIG. 6A is a timing chart of a tempo setting operation example in mode 3.
Figure 6B:
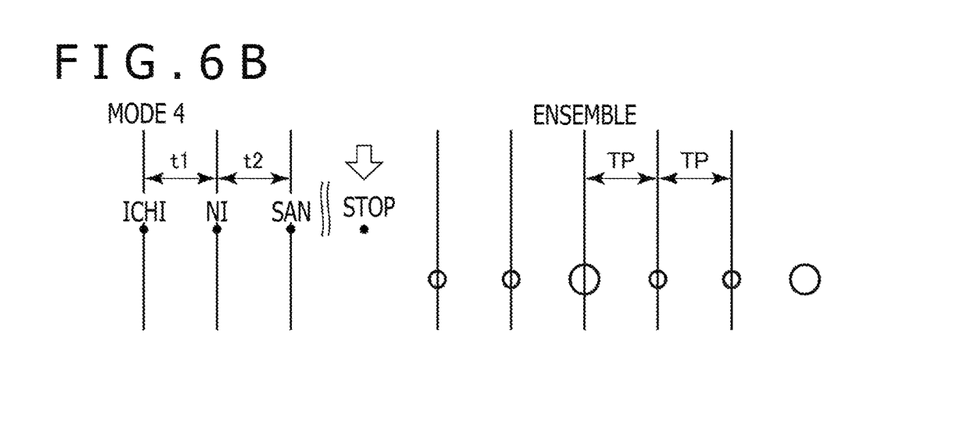
FIG. 6B is a timing chart of a tempo setting operation example in mode 4.

When "Ichi" representing the beginning utterance is detected, the controller 31 waits for detection of the subsequent utterance of the detection target. At this timing, which set in the above-described seven sets corresponds to the combination of the utterances has not been settled. Then, after "Ichi," "Ni," and "San," if "Yon," which is the subsequent utterance in the order, is not detected even after the elapse of the time Tx, the controller 31 decides the meter from the number of consecutive times thus far (or last utterance). In the example of FIG. 6A, the time Tx elapses after "San" and therefore the meter (three-four time), the tempo, and the beat timing are decided at the timing indicated by an arrow. The beat interval TP and the beat timing are decided similarly to the case of mode 1. The form of "presentation sound emission" after the metronome pattern is decided is similar to that of mode 1. In this example, it turns out that the meter is triple time because the last utterance is "San." The meter is quadruple time when the last utterance is "Yon." In this manner, the tempo and the meter are decided in response to detection of the utterances corresponding to the predetermined combination in the order defined in advance. In the combinations of utterances, what includes utterances that are not necessarily associated with numerical values for the user is also included. For example, when "Se" "No" including two utterances is employed as a combination and "Se" is set as the beginning utterance, they can be treated similarly to "Ichi" "Ni." Besides, the modification examples described regarding mode 1 can be applied as appropriate.

In mode 3, as the combinations of utterances, not only "Ichi, ni, san, yon" and so forth but also "One, two, three" and so forth may be employed as the detection target. Alternatively, both of them may be employed as the combinations of the detection target. Therefore, in plural combinations of utterances of the detection target, combinations different in the beginning utterance may exist in a mixed manner. For example, suppose that "Ichi" is the beginning in a certain set whereas "One" is the beginning in another set. Furthermore, when the utterance corresponding to the beginning in any combination in the utterances of the detection target is detected, the controller 31 waits for detection of the second and subsequent utterances of the combination to which the utterance belongs, and decides the tempo and so forth when the utterances are detected in turn.

In mode 4 (FIG. 6B), the utterances of the detection target and the combinations thereof are defined similarly to mode 3 and "Stop" is employed as the utterance for instruction stop. When "Ichi" representing the beginning utterance is detected, the controller 31 waits for detection of the subsequent utterance of the detection target. At this timing, which set in the above-described seven sets corresponds to the combination of the utterances has not been settled. Then, after "Ichi," "Ni," and "San," at the timing when "Stop" is detected, indicated by an arrow, the controller 31 decides the meter (three-four time), the tempo, and the beat timing. The beat interval TP and the beat timing are decided similarly to the case of mode 1. The form of "presentation sound emission" after the metronome pattern is decided is similar to that of mode 1. Besides, the modification examples described regarding mode 2 can be applied as appropriate.

Figure 6C:
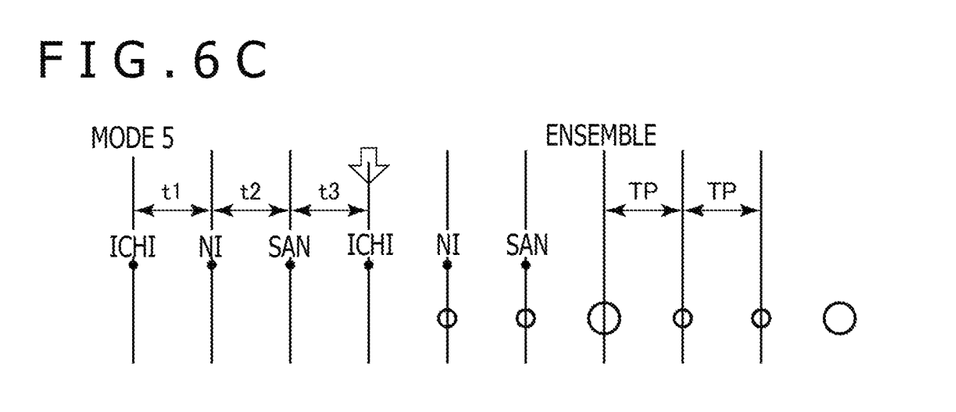
FIG. 6C is a timing chart of a tempo setting operation example in mode 5.

Suppose that, in mode 5 (FIG. 6C), the utterances of the detection target and the combinations thereof are similar to those of mode 3. In mode 5, the controller 31 decides the tempo and so forth after waiting until the utterance corresponding to the beginning in the utterances belonging to a combination is detected again. Suppose that, as illustrated in FIG. 6C, after consecutive utterances of "Ichi," "Ni," and "San," "Ichi" at the beginning is uttered again. In this case, from the order of utterance of "San," which is the immediately-previous utterance, the controller 31 decides the meter (three-four time), the tempo, and the beat timing at the timing indicated by an arrow. That is, when the utterance representing the first beat (Ichi) is detected again after the utterance of each beat is detected in order from the utterance representing the first beat (Ichi), the meter is decided based on the utterance (San) representing the beat before the utterance representing the first beat is detected again. The beat interval TP is the average of the utterance interval of each utterance as one example and is calculated based on TP=(t1+t2+t3)/3. In this case, it turns out that the meter is triple time because the utterance immediately before "Ichi" of the second round is "San." The meter is quadruple time when the utterance immediately before "Ichi" of the second round is "Yon." The beat timing is decided similarly to the case of mode 1. The form of "presentation sound emission" after the metronome pattern is decided is similar to that of mode 1.

Suppose that, in mode 6 (FIG. 6D), the meter has been set in the standby state. The meter can be set by the user with the setting operation element 17. Suppose that the utterances of the detection target and the combinations thereof are similar to those of mode 3. Suppose that the meter has been set to three-four time in advance in the example of FIG. 6D.

Figure 6D:
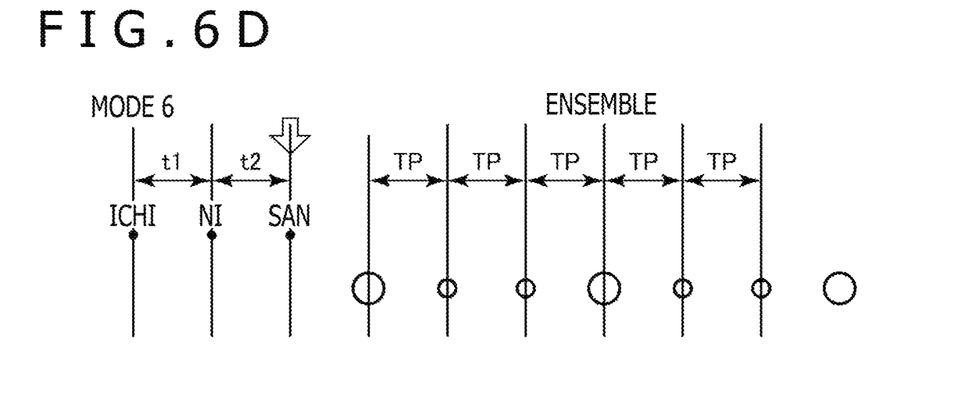
FIG. 6D is a timing chart of a tempo setting operation example in mode 6.

Therefore, the utterance of the tail end is "San." Suppose that consecutive utterances of "Ichi," "Ni," and "San" are made to the tail end in the order defined in advance as illustrated in FIG. 6D. In this case, the controller 31 decides the tempo and the beat timing at the timing when the last "San" is uttered, indicated by an arrow. The beat interval TP and the beat timing are decided similarly to the case of mode 1. The form of "presentation sound emission" after the metronome pattern is decided is similar to that of mode 1. For example, "Se" "No" including two utterances may be employed as a combination and the meter may be set to double time, and the tempo and the beat timing may be allowed to be decided when "No" is uttered subsequently to "Se." In this case, the beat interval TP depends on the time interval between "Se" and "No."

Incidentally, although not illustrated in the diagram, besides modes 1 to 6, a periodicity mode may be set in which the tempo is decided based on the detection interval of utterances when the order of detection of utterances corresponding to a predetermined combination indicates periodicity. For example, the controller 31 determines that periodicity exists when two or more sets of the same repetition of the utterances of the detection target are consecutive. Alternatively, the controller 31 determines that periodicity exists when a pattern of "after a specific utterance, a predetermined number of times of another utterance is made" consecutively occurs two or more times. Besides, periodicity may be determined through collating consecutive utterances with various rules defined in advance and analyzing repeatability.

As one example, a consideration will be made with applying of the periodicity mode to mode 5 (FIG. 6C). A configuration may be employed in which only the beginning utterance is decided in the utterances belonging to the combination of the detection targets and the order of the other utterances does not matter. For example, "Ton" is employed as the beginning utterance and "Hei" and "Ho" are employed as the other utterances. Suppose that, in the controller 31, after "Ton," the utterances of the detection target other than "Ton" are detected in random order and thereafter "Ton" of the second round is detected. In this case, the controller 31 decides the meter based on the number of times of utterance before "Ton" of the second round is detected. Besides, only the utterance of the tail end may be decided. In this case, when the utterance of the tail end is detected after the utterances of the detection target are detected in random order, the controller 31 decides the meter based on the number of times of utterance until the utterance of the tail end. Both the beginning utterance and the utterance of the tail end may be decided and, after the beginning utterance, when the utterance of the tail end is detected after the utterances of the detection target are detected in random order, the meter may be decided based on the number of times of utterance until the utterance of the tail end.

Incidentally, tempo modification like that illustrated in FIG. 4B can be applied to each tempo setting mode. Execution of the tempo modification is based on the premise that the tempo has been set once. The controller 31 modifies the tempo based on the detection interval of newly-detected utterances in response to new two or more times of consecutive detection of the utterance of the detection target. For example, in mode 1 (FIG. 5A), when "Ton" is newly detected in execution of presentation sound emission, the controller 31 temporarily stops the presentation sound emission based on the metronome pattern set thus far. In addition, the controller 31 makes a transition to the same operation as that when "Ton" is detected in the standby state. Furthermore, when utterances corresponding to a predetermined combination are newly detected in the order defined in advance, the controller 31 modifies the tempo based on the detection interval of the detected utterances. For example, in mode 5 (FIG. 6C), when "Ichi" is newly detected in execution of presentation sound emission, the controller 31 temporarily stops the presentation sound emission based on the metronome pattern set thus far. In addition, the controller 31 makes a transition to the same operation as that when "Ichi" is detected in the standby state. In the periodicity mode, when the order of detection indicating the periodicity of utterances corresponding to a predetermined combination is newly detected, the controller 31 modifies the tempo based on the detection interval of the newly-detected utterances.

Figure 7:
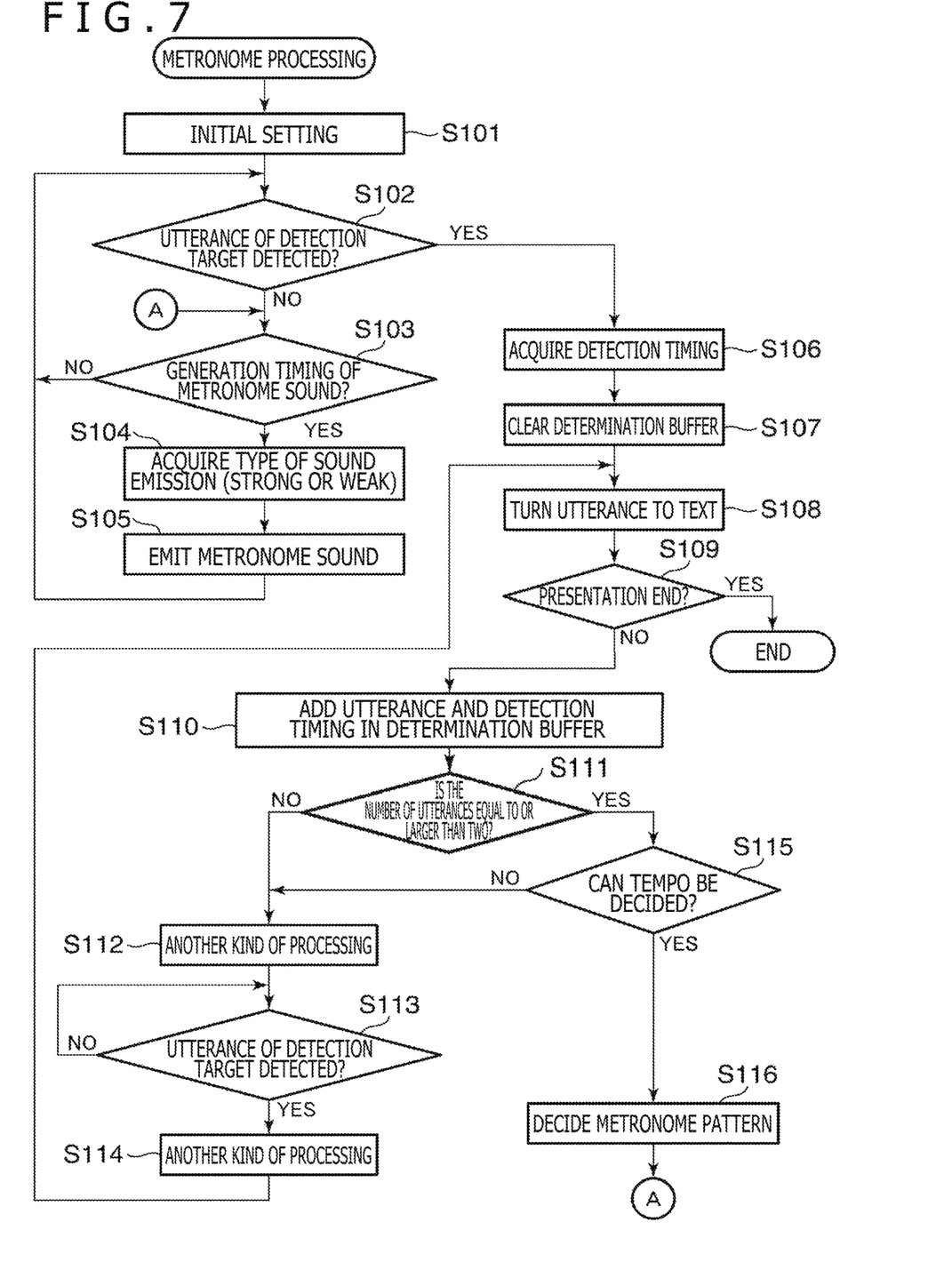
FIG. 7 is a flowchart of metronome processing.

Next, processing to implement the operation of the tempo setting mode described thus far will be described with FIG. 7. FIG. 7 is a flowchart of metronome processing. This processing is implemented through reading-out of a program stored in the ROM 12 to the RAM 13 and execution of the program by the CPU 10. This processing is started when an instruction to start the operation of the tempo setting mode is made.

First, the CPU 10 executes initial setting (step S101). In this initial setting, in addition to setting of the kind of tempo setting mode, setting of the utterances of the detection target, setting of combinations, and tone setting, setting of the order of utterance in the combinations, setting of the meter in the case of mode 6, and so forth are carried out according to need. Next, the CPU 10 determines whether or not the utterance of the detection target has been detected (step S102). If the utterance of the detection target has been detected, the CPU 10 acquires the detection timing thereof (step S106). Then, the CPU 10 clears a determination buffer stored in the RAM 13 (step S107). The determination buffer is a register for recording detected utterances.

Next, the CPU 10 turns the utterance detected this time to text (step S108) and determines whether or not presentation sound emission should be ended (step S109). Here, when an utterance indicating a predetermined end instruction by the leader (for example, finish, end, or the like) is detected, it is determined that the presentation sound emission should be ended. Alternatively, the end instruction may be allowed to be made by predetermined operation with the setting operation element 17. Then, the CPU 10 ends the processing of FIG. 7 when determining that the presentation sound emission should be ended. On the other hand, if the presentation sound emission should not be ended, the CPU 10 causes the determination buffer to additionally store information indicating the utterance that has been detected this time and been turned to text and the detection timing thereof (step S110).

Next, the CPU 10 determines whether or not the number of utterances stored in the determination buffer is equal to or larger than two (step S111). If the number of utterances stored in the determination buffer is smaller than two, the CPU 10 executes another kind of processing (step S112). In this "another kind of processing," the CPU 10 executes processing of sound emission that follows the utterance of this time, and so forth, for example. Next, the CPU 100 continues the determination of whether or not the utterance of the detection target has been detected again (step S113). Then, when the utterance of the detection target is detected, the CPU 10 executes another kind of processing (step S114) and returns the processing to the step S108. Also, in this "another kind of processing," the CPU 10 executes processing of sound emission that follows the utterance detected anew, and so forth, for example.

If the number of utterances stored in the determination buffer is equal to or larger than two as the result of the determination in the step S111, the CPU 10 determines whether or not the tempo can be decided from the stored two or more utterances (step S115). Here, it is determined whether the tempo can be decided in accordance with the rule of each mode described with FIGS. 5A and 5B and FIGS. 6A, 6B, 6C, and 6D. When mode 1 (FIG. 5A) is taken as an example, it is determined that the tempo can be decided due to the elapse of the time Tx after the last (third) utterance of the consecutive pieces of "Ton." Here, in the case of the periodicity mode, it is determined that the tempo can be decided when it is detected that periodicity with respect to consecutive utterances exists.

Then, if it is not possible to decide the tempo (in mode 1, before the elapse of the time Tx after detection of "Ton"), the CPU 10 advances the processing to the step S112. On the other hand, if the tempo can be decided, the CPU 10 advances the processing to a step S116. In the step S116, the CPU 10 decides the metronome pattern according to the mode. For example, the CPU 10 decides the meter, the tempo, and the beat timing in modes 1 to 5 and decides the tempo and the beat timing in mode 6. The decided metronome pattern is stored in the RAM 13. Thereafter, the processing returns to the step S103.

If the utterance of the detection target is not detected as the result of the determination in the step S102, it is determined whether or not the generation timing of metronome sound has come. Here, when the metronome pattern has been already set and the timing when sound emission according to it should be carried out has come, it is determined that the present timing is the generation timing of metronome sound. Then, if the present timing is not the generation timing of metronome sound, the CPU 10 returns the processing to the step S102. On the other hand, if the present timing is the generation timing of metronome sound, the CPU 10 acquires the type of sound emission (for example, whether the sound emission is for a strong beat or for a weak beat) (step S104) and emits the metronome sound in accordance with the type of sound emission (step S105) to return the processing to the step S102. When the utterance of the detection target is detected in the step S102 of the second or subsequent round, the tempo and the meter are reset (modified).

According to the present embodiment, in response to two or more times of consecutive detection of the utterance of the detection target, the tempo is decided based on the detection interval of the utterances and the set metronome pattern is presented. For example, the tempo is decided in response to detection of utterances corresponding to a predetermined combination in the order defined in advance. Alternatively, the tempo is decided when the order of detection of utterances corresponding to a predetermined combination indicates periodicity. Thus, the tempo can be set by utterances and troublesome operation of an operation element is unnecessary.

Furthermore, the meter is decided in response to detection of utterances corresponding to a predetermined combination in the order defined in advance. Alternatively, the meter is decided based on the number of times of consecutive detection of the utterance of the detection target. Alternatively, when the utterance that represents the first beat is detected again, the meter is decided based on the utterance that represents the previous beat. Due to this, the meter can be set by utterances and troublesome operation of an operation element is unnecessary.

Moreover, also after tempo setting, the tempo and the meter can be modified when the utterance of the detection target is detected anew. Therefore, favorable usability is provided.

In the present embodiment, modes 1 to 6 are exemplified as the tempo setting mode and the periodicity mode is exemplified. However, modes other than them can also be set. Furthermore, plural modes may be simultaneously applied as long as no contradiction is caused.

As described above, the metronome pattern may be presented by displaying, action, or a combination of them besides presentation by sound.

In detection of the utterance of the detection target, detection in consideration of "utterance variation" may be allowed. For example, different utterances that mean the same number may be treated as the same utterance. For example, "Shi" may be uttered as "Yon" and "Shichi" may be uttered as "Nana."

The meaning of a command may be allowed to be understood separately from the utterance of the detection target and an instruction of setting, modification, or the like of the tempo, the sound volume, the tone, and so forth by the command may be allowed to be made.

In the sequencer 39, a device for assisting musical instrument practice, a karaoke device in which sequence data of musical pieces is stored originally, and so forth are also included. Setting of repetition, setting of jump, rhythm pattern, and accompaniment pattern, and so forth may be allowed to be carried out to the sequencer 39 based on detection of utterance. Furthermore, according to the tempo (or reproduction speed) decided based on detection of utterance, the sequence data may be reproduced or the reproduction tempo (or reproduction speed) may be modified in reproduction.

When the present disclosure is applied to the metronome 30 or the information terminal device 40, a configuration may be made in such a manner that activation of the device, start of operation of the tempo setting mode, initial setting in the step S101 in FIG. 7, and so forth can be all ordered by utterance. For example, a user utters the name of the device to which the present disclosure is applied to activate the device, and starts the tempo setting mode by an utterance of "Metronome" or the like to order start of operation of the tempo setting mode. Thereafter, the user carries out the initial setting by a predetermined utterance and then makes the utterance of the detection target as described above.

When the present disclosure is implemented by the information terminal device 40 such as a smartphone, the presenting device connected to it is not limited to the metronome 30 and the sequencer 39. The method for acquiring an application for implementing the present disclosure does not matter. The application executed in the information terminal device 40 does not have to be installed on the information terminal device 40 originally and may be downloaded to be installed thereon in a posterior manner.

The present disclosure is described in detail above based on preferred embodiments thereof. However, the present disclosure is not limited to these specific embodiments and various forms in such a range as not to depart from the gist of this disclosure are also included in the present disclosure. Part of the above-described embodiment may be combined as appropriate.

A storage medium that stores a control program represented by software for achieving the present disclosure may be allowed to provide the same effects through reading-out of the program to the present device. In this case, the program code itself read out from the storage medium implements novel functions of the present disclosure and a non-transitory computer-readable recording medium that stores the program code configures the present disclosure. Furthermore, the program code may be supplied through a transmission medium or the like and the program code itself configures the present disclosure in this case. As the storage medium in these cases, besides a ROM, floppy disk, hard disk, optical disc, magneto-optical disc, CD (compact disc)-ROM, CD-R (recordable), magnetic tape, non-volatile memory card, and so forth can be used. The "non-transitory computer-readable recording medium" includes also what holds a program for a certain time like a volatile memory (for example, dynamic random access memory (DRAM)) inside a computer system that serves as a server or client when the program is transmitted through a network such as the Internet or a communication line such as a telephone line.

What is claimed is:

1. A tempo setting device, comprising:
   a detecting unit configured to:
      deem a predetermined utterance as a detection target, and
      detect an utterance of the detection target through recognition of sound;
   a tempo deciding unit configured to determine, in response to two or more times of consecutive detection of the utterance of the detection target by the detecting unit, a tempo based on a detection interval between the two or more times of the consecutive detection of the utterance of the detection target; and
   a setting unit configured to set the tempo determined by the tempo deciding unit.

2. The tempo setting device according to claim 1, wherein
   a plurality of utterances exists as the utterance of the detection target,
   the tempo deciding unit is further configured to determine the tempo based on the detection interval in response to detection, by the detecting unit, of specific utterances of the plurality of utterances corresponding to a predetermined combination, and
   the predetermined combination includes the specific utterances in an order defined in advance.

3. The tempo setting device according to claim 2, wherein
   the predetermined combination includes the specific utterances that represent each beat from a first beat to a predetermined beat,
   the tempo setting device further includes a meter deciding unit configured to determine a meter in response to the detection of the specific utterances corresponding to the predetermined combination, and
   the setting unit is further configured to set the meter determined by the meter deciding unit in addition to the determined tempo.

4. The tempo setting device according to claim 3, wherein
   when a first utterance of the specific utterances that represents the first beat is detected again by the detecting unit after the specific utterances are detected by the detecting unit in an order from the first utterance, the meter deciding unit is further configured to determine the meter based on a second utterance of the specific utterances that represents a beat before the first utterance that represents the first beat is detected again.

5. The tempo setting device according to claim 3, further comprising:
   a presenting unit configured to present the meter and the tempo set by the setting unit by sound emission.

6. The tempo setting device according to claim 5, wherein
   the presenting unit is further configured to make a form of sound emission different between a strong beat and a weak beat in the set meter.

7. The tempo setting device according to claim 2, wherein
   in a state in which the tempo has been set, in response to new detection of each of the specific utterances corresponding to the predetermined combination by the detecting unit, the tempo deciding unit is further configured to modify the tempo based on a detection interval between the new detection of each of the specific utterances.

8. The tempo setting device according to claim 1, wherein
   a plurality of utterances exists as the utterance of the detection target, and
   the tempo deciding unit is further configured to determine the tempo based on the detection interval when an order of detection, by the detecting unit, of specific utterances of the plurality of utterances corresponding to a predetermined combination indicates periodicity.

9. The tempo setting device according to claim 8, wherein
   in a state in which the tempo has been set, in response to new detection of the order of the detection indicating the periodicity of the specific utterances by the detecting unit, the tempo deciding unit is further configured to modify the tempo based on a detection interval between the detection of each of the specific utterances newly detected.

10. The tempo setting device according to claim 1, further comprising:
    a meter deciding unit configured to determine a meter based on a number of times of the consecutive detection of the utterance of the detection target by the detecting unit,
       wherein the setting unit is further configured to set the meter determined by the meter deciding unit in addition to the determined tempo.

11. The tempo setting device according to claim 1, further comprising:
    a presenting unit configured to present the tempo set by the setting unit.

12. The tempo setting device according to claim 1, wherein
    in a state in which the tempo has been set, in response to two or more times of new consecutive detection of the utterance of the detection target by the detecting unit, the tempo deciding unit is further configured to modify the tempo based on a detection interval between the two or more times of the new consecutive detection of the utterance.

13. A control method of a tempo setting device, the control method comprising:
    deeming a predetermined utterance as a detection target;
    detecting an utterance of the detection target through recognizing sound;
    determining, in response to two or more times of consecutive detection of the utterance of the detection target, a tempo based on a detection interval between the two or more times of the consecutive detection of the utterance of the detection target; and
    setting the determined tempo.

14. A non-transitory computer-readable medium having stored thereon computer-executable instructions which, when executed by a processor, cause the processor to execute operations, the operations comprising:
    deeming a predetermined utterance as a detection target;
    detecting an utterance of the detection target through recognizing sound;

determining, in response to two or more times of consecutive detection of the utterance of the detection target, a tempo based on a detection interval between the two or more times of the consecutive detection of the utterance of the detection target; and
setting the determined tempo.

\* \* \* \* \*